Oct. 13, 1970

G. HANNAPPEL ET AL    3,534,162

FOLLOWER CONTROL DEVICE FOR TRACING PROCESSING MACHINES

Filed June 12, 1967      3 Sheets—Sheet 1

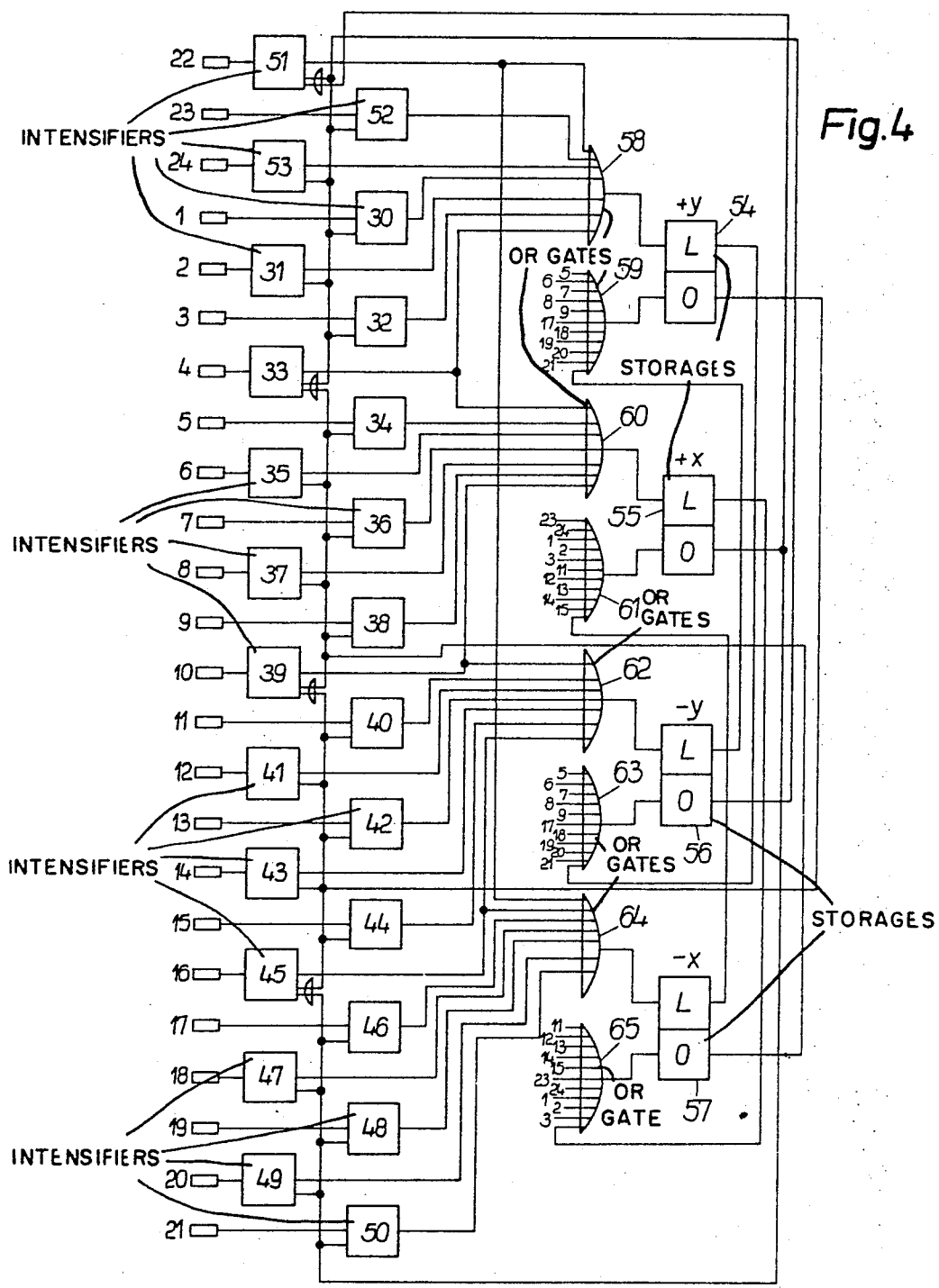

United States Patent Office 3,534,162
Patented Oct. 13, 1970

3,534,162
FOLLOWER CONTROL DEVICE FOR TRACING PROCESSING MACHINES
Gunther Hannappel, Frankfurt am Main, and Gunter Hahn, Hausen, Germany, assignors to Messer Griesheim GmbH, Frankfurt am Main, Germany, a corporation of Germany
Filed June 12, 1967, Ser. No. 645,159
Claims priority, application Germany, June 10, 1966, M 69,792
Int. Cl. H04n 1/12
U.S. Cl. 178—6                                        13 Claims

ABSTRACT OF THE DISCLOSURE

A follower control device for tracing procession machines such as flame cutting machines includes an arrangement for scanning the line, edge or other pattern to be traced with the reproduction being by a photoelectric receiver. A multiple receiving device scans the pattern with a plurality of independently actuated individual scanning members which are adjusted to a predetermined direction, and which are operatively connected to the scanning device.

BACKGROUND OF INVENTION

Photoelectric devices have been known whose light receivers, e.g. photoelectric resistors or photoelectric diodes, are conducted during the scanning process by means of servomotor in the direction preset by the geometry of the receiver parallel to the line to be scanned. In these devices the signals for the displacing of the servomotor are generally achieved by detuning a DC or AC supplied bridge circuit, wherein at least one bridge branch consists of a light-sensitive structural element. Devices of this type as described in German Pat. 1,143,911 necessitate the rotation required for the purpose of following up of the light receiver or receivers and also of the lamp serving for illumination of the drawing pattern.

The energizing of the lamp and the transmission of the photoelectric signals takes place in such devices by means of movable sliding or liquid contacts. The life expectancy of such mechanical contact arrangements, however, is limited, and the degree of accuracy of contacting, because of chemical contact changes, often does not fulfill the required demands. One of such demands in the use of semiconductor photoelectric diodes in the bridge branch, for example, is that voltages of a few thousandths volt must be satisfactorily transmitted when the tracing properties of the scanning device should not be considerably impaired. Starting with this requirement, various photoelectric scanning devices have been proposed whose light sensitive elements are firmly mounted mechanically or electrically. For example, in one of these arrangements instead of a receiver or receivers, only a multisectional prism is turned by a servomotor in such a manner that the image of the drawing line remains constant on the receiver. Such an arrangement is particularly free of contact transfer problems, but not free of rotating parts, for which the highest precision is required in the interests of great tracing accuracy and which, as a result of its mass moment of inertia, is burdened by a great time constant and incline for the overswing. A further disadvantage is in the necessary electronics required for the energizing of the servomotor.

SUMMARY OF INVENTION

According to the invention, this problem is solved by a multiple scanning arrangement for the scanning of the line or curve to be traced with several independently actuated individual scanning members, each of which is adjusted to a certain direction and at its outlet is connected by means of a combination of conventional connecting devices with an adjusting device for the scanning arrangement. The scanning takes place preferably optically by means of an optical system, stationary in relation to a photoelectric receiver, with which the line to be traced is transferred, which is preferably illuminated by a light source fixed relative to the receiver and the optical system. The scanning could take place, however, also by means of a video arrangement.

The surveying field of the receiver, hence the projection surface of a photoelectric receiver for example, is broken down into several direction oriented and preferably symmetrically arranged sections operated independently of each other. In this connection, the transmission system is centrally arranged in relation to the receiver, hence an optical system in relation to the photoelectric receiver for example, in such a manner that the curve or the line to be traced is reproduced on at least one receiver section each in diametrical areas of the receiver.

In a follower control device of this invention mechanically moved parts are entirely avoided in the path of rays between the drawn pattern and the receiver. This considerably increases the operational reliability of such equipment, and the signals supplied by the individual receiver sections can be converted by a suitable combination of conventional functional connecting devices directly to a mechanical tracking movement of the scanning arrangement, which is connected with a tool support either mechanically or electrically by means of a follow-up control. In this connection, the regulating signal can affect one or several electric adjusting motors or pneumatic or hydraulic adjusting devices.

THE DRAWINGS

FIG. 1 schematically illustrates one embodiment of the receiver arrangement of an inventively constructed follower control device;

FIG. 2 schematically illustrates another embodiment of the arrangement of an inventively constructed follower control device;

FIG. 4 shows a block diagram of an electronic equipment for the transmission of the receiver signals to the adjusting device;

DETAILED DESCRIPTION

Figure 1:
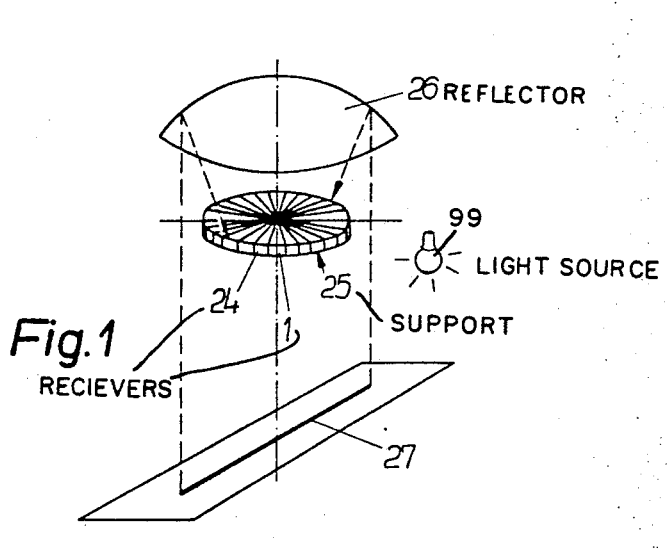

FIG. 1 shows an embodiment of an inventively constructed receiver arrangement. As indicated therein a black line on a light background to be scanned is designated with reference numeral 27, which is illuminated by an illuminating arrangement, indicated schematically by reference numeral 99 and reproduced by means of reflector optics 26 on the circular support 25 of the photoelectric receivers 1 to 24. The number of the receivers selected is arbitrary and can be any amount between two and any number required by the desired resolution.

Figure 2:
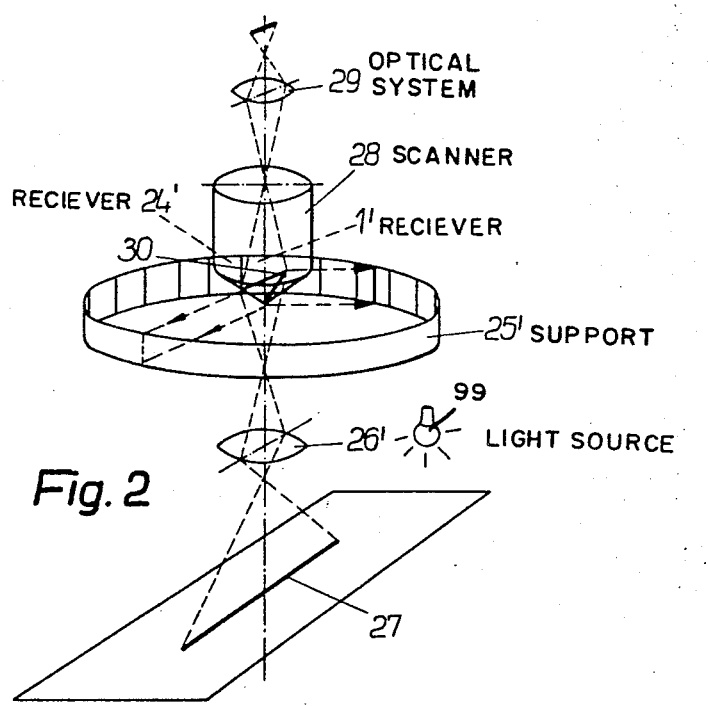

Another arrangement, which is based on the same inventive thought, is shown for example in FIG. 2. There the line 27 to be scanned is projected over optics 26' on the reflecting cone of the post 28.

The projection of the line is divided by the cone surface into two rays displaced at exactly 180°, which preferably are reproduced on the inner surface of the cylinder 25' by means of a ray limiting circular slot diaphragm and a ring-shaped light intensity increasing convex lens.

For the sake of clarity the slotted diaphragm and ring-convex lens are not shown, however the two would comprise a concentric diaphragm with its slot running parallel to 25' and a ring-convex lens disposed in relation to the diaphragm slot so as to focus the light upon the receiver's of 25', thus producing a result analogous FIG. 1 on two light receivers diametrically opposed to each other from receivers 1'-24'.

In order to be able to undertake a positioning of the scanning arrangement, there is provided a second optical system 29, acting as an occular or projection arrangement, which allows the observance of the line picture resulting in plane 130 in the interior of post 28 which can be of any suitable construction to be reflective and permit the image to pass through by being for example constructed of half-silvered mirror surfaces.

The conversion of the electrical information, obtained according to FIGS. 1 and 2, to clear control commands for the successive movement requires inventively switching steps which are mentioned below.

FIG. 3 again shows a top view of the photoelectric receivers 1-24, illustrated in FIG. 1. They are divided into four sections or quadrants +y to —x. Each section corresponds to a preferential feed direction as explained further hereafter. The individual circular sector shaped receivers 1-24 can still be graduated in radial direction into individual receiver sections. In such a way there can be obtained additional scanning scanning signals characterizing the extend of a deviation and therefore the required adjusting movement.

As already noted above, the scanned line 27 is reproduced on two diametrical receivers. Since each receiver has arranged to it a certain feed direction of the follow-up system the by-pass direction is not given at first. Its clear presupposition is apparently possible only if the simultaneous activation of two cells opposite each other is avoided. Inventively, for this, the section opposite the scanning point is closed. Altogether four electric closing devices are provided. Hereafter, they are referred to as a storage. Such a storage can preferably consist of a conventional flip-flop switch or a relay. The storage for the +y direction therefore includes for example receivers 22 to 4, while the effect of the +x storage extends to receivers 4 to 10.

FIG. 4 for example diagrammatically illustrates the combination of the receivers 1 to 24 with conventional intensifiers 30 to 53 and OR gates 58 to 65 with storages 54 to 57. It is recognized that for example storage 54 (+y) is operable when the storages 55 to 57 are in the 0 position. The adjustment of the storages is carried out manually prior to the scanning process, for example by means of a switch. Thereby the starting and by-pass direction of the scanning process is clearly set.

Figure 3:
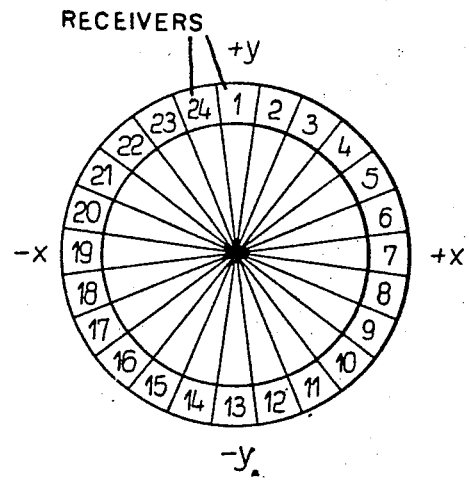
FIG. 3 is a top view of a receiver arrangement according to FIG. 1 in an enlarged scale.

After introduction of these storages, the scanning process of FIG. 3 can be easily explained: Assuming that in illuminating the receiver 1, the advance takes place exclusively in the direction +y, while in illuminating receiver 7 only an advance in the +x direction takes place. There then results for receivers 2 to 6 a simultaneous movement in the +y and +x direction whose extent lies between the above-named critical values.

As an example for the transfer of the line image from one sector to another, reference is made to the operational sequence of FIGS. 3 and 4, beginning with receiver 22 in the direction +x. By reaching the receiver 4 by means of the light sector, there results the following situation: Storage 55 (+x) is switched on by means of the OR gate 60 connected in series, while the storage 54 still remains switched on by means of OR gate 58. In illuminating receiver 5, the storage 54 goes to 0 over OR gate 59, while storage 55 is additionally switched on over OR gate 60. Thus the transfer of sector —y to +x is completed.

The following is an explanation of the manner in which the problem of the driving direction is solved in the above example, i.e. the manner in which the opposite sector is switched off.

If half of the scanning line is located on receiver 4, for example, then storages 54 and 55, as shown above, are switched on. The advancement after simultaneous switching off of storages 56 and 57 is achieved in that each of the receivers-intensifiers 30 to 53 is provided with an AND requirement. If for example storage 54 is switched on, storage 56 is set on 0 by means of its outlet L. The 0 outlet of storage 56 then supplies voltage and activates the intensifiers 51 to 33 inclusive. At the same time storage 54 at 0 outlet supplied no voltage, so that the intensifiers 39–45 inclusive are closed, and receivers 10 to 16 become inactive.

This example, shown for receivers 22 to 4, according to FIG. 4 is, of course, transferrable to all sectors.

The following explains the manner in which a conversion of the signals supplied by intensifiers 30 to 53 is brought to analogous theoretical values for longitudinal or transverse propulsion.

Figure 5:
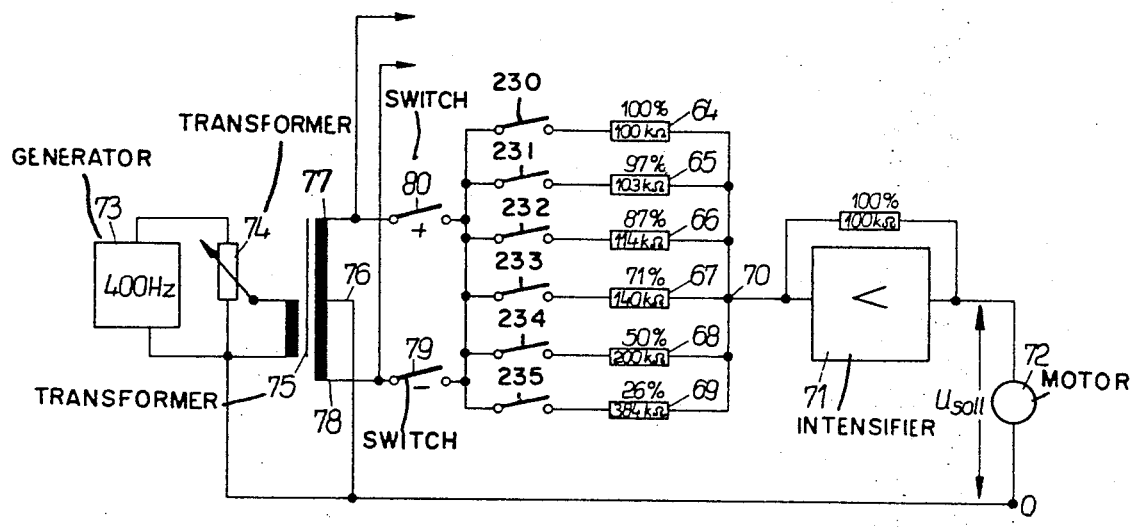
FIG. 5 shows a detailed representation of a part of the block diagram of FIG. 4.

In this connection, it is assumed that the $x$ and $y$ movement occurs in the known manner by a brush shifting motor and that the intensifiers 30 to 53—corresponding to an on and off switch—can be in one of two possible switch situations. In FIG. 5 six such switches 230 to 235 are shown. A conventional interlocking switch system (not shown) assures that a switch can be switched on only at a given time. Each of them is arranged in a line with one of the resistors 264 and 269 determining speed whose common point 70 is connected with intensifier 71 driving directly or indirectly the $x$ or $y$ motor 72.

The voltage required for driving this device is supplied by the 400 cycles per second generator 73. Its starting voltage and thus the primary speed of motor 72 is regulated by means of a regulating transformer 74 and is conducted to the separating transformer 75 whose secondary side is provided with the center tapping 76. According to the position of the mechanical or electrical switches 79 and 80, mutually interlocked a potential occurs either in 77 or in 78 at the common points of switches 230 to 235. By means of switches 79 and 80, the polarity of the supply voltage becomes relative to the center and thus by a suitable construction of the intensifier 71, the direction of rotation of motor 72 is changed. The direction change is determined by the receivers. An electric stress of receivers 1–6 and 20–24 corresponds to the positive direction of rotation of the longitudinal brush-shifting motor ($y$ motor), while the negative direction of rotation is determined by receivers 8 to 18.

Figure 6:
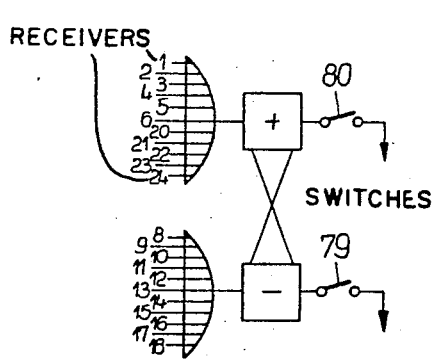
FIG. 6 shows a further partial representation of the diagram of FIG. 4.

The distinction between positive and negative direction of rotation is undertaken in a known manner according to FIG. 6 in an OR switch with internal locking mechanism. In it the numbers symbolically correspond to those of the receiver as indicated in FIG. 4.

Included in the invention is the possibility of using the control voltage occurring between points 70 and 76 and/or 72 and 76, analogous to the illumination relationship of the receiver, not only for driving of a control motor, i.e. of an electromechanical transmitter, but even for supplying of a light source, for example. This gives the possibility of a wireless remote control of follower movements.

The inventively constructed adjusting device can be constructed in different manners within the scope of the inventive thought. Instead of the described intensifiers 30–53 and the storages 54–57, there can be used other storage members, for example ferrite core storage members. As the receiving member, a tube with several photo cathodes can also be provided which offers a directional orientation. As would be apparent the several or plurality of photo cathodes would be analogous to and thus function the same as the plurality of photoelectric cells. Additionally a spatial adjustment could be achieved by using a second adjusting device.

What is claimed is:

1. In a follower control device for process machine tracing, including a non-rotatable scanning head for scanning the pattern to be traced, illuminating means for illuminating the pattern to be traced, said scanning head incorporating optical means for reflecting an image of the illuminated pattern, receiving means for receiving the reflecting image, said receiving means having a plurality of individual receiving members actuatable independently of one another, each of said receiving members being associated with a fixed pre-selected scanning direction, and the outlet of each member being connected to a position adjusting device for moving said scanning head to the desired position in accordance with said pattern to be followed.

2. In a follower control device as set forth in claim 1 wherein said receiving means is a photoelectric receiver means, said optical means being opposite said photoelectric receiver means, said illuminating means being in the form of a stationary light source being opposite said receiver means and said optical means, and the projection surface of said receiver means being divided into a plurality of different direction orientation sections which comprise said receiving members.

3. In a follower control device as set forth in claim 2 wherein said scanning means is disposed for producing the pattern image on at least one receiver section in diametrically opposite areas of said receiver means.

4. In a follower control device as set forth in claim 2 wherein said receiver means is of disk-like construction with said sections being symmetrically disposed as circular sector shaped light receivers.

5. In a follower control device as set forth in claim 4 wherein said receiver means is disposed eccentrically in the cone of a parabolic mirror.

6. In a follower control device as set forth in claim 4 wherein each sector is radially subdivided into further individual light receivers.

7. In a follower control device as set forth in claim 3 wherein said receiver means includes a cylindrical portion, said scanner means including an optically reflecting cone, and said light receiving sections being disposed juxtaposed each other on the interior of said cylindrical portion concentric to said reflecting cone.

8. In a follower control device as set forth in claim 7 includes a second optical means for observing the pattern prior to and during the scanning process.

9. In a follower control device as set forth in claim 1 wherein said scanning members are arranged in four quadrant groups of light receivers, control switch means for said groups, said switch means including locking means for preventing the actuation of two diametrically opposite light receivers, said locking means including gate steps and storage circuits.

10. In a follower control device as set forth in claim 9 wherein said storage circuits include a flip-flop switch having an adjustable starting position.

11. In a follower control device as set forth in claim 9 wherein each light receiver is connected to two diametrically opposite locking means by means of intensifiers.

12. In a follower control device as set forth in claim 9 wherein each light receiver is connected to two diametrically opposite locking means by means of OR gates.

13. In a follower control device as set forth in claim 1 wherein said receiving means includes a tube having a plurality of photocathodes.

References Cited
UNITED STATES PATENTS

| | | | |
|---|---|---|---|
| 2,933,668 | 4/1960 | Brouwer | 250—202 |
| 3,198,949 | 8/1965 | Holo | 250—202 |

ROBERT L. GRIFFIN, Primary Examiner

B. L. LEIBOWITZ, Assistant Examiner